United States Patent
Yan

(10) Patent No.: US 9,229,798 B2
(45) Date of Patent: Jan. 5, 2016

(54) ERROR HANDLING METHOD, MEMORY STORAGE DEVICE AND MEMORY CONTROLLING CIRCUIT UNIT

(71) Applicant: PHISON ELECTRONICS CORP., Miaoli (TW)

(72) Inventor: Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 126 days.

(21) Appl. No.: 14/248,346

(22) Filed: Apr. 9, 2014

(65) Prior Publication Data
US 2015/0193291 A1    Jul. 9, 2015

(30) Foreign Application Priority Data
Jan. 9, 2014    (TW) .................................. 103100843

(51) Int. Cl.
*G06F 11/00*    (2006.01)
*G06F 11/07*    (2006.01)

(52) U.S. Cl.
CPC .................................. *G06F 11/0727* (2013.01)

(58) Field of Classification Search
CPC . H04L 1/0026; G06F 11/076; G06F 11/0745; G06F 11/0727; G06F 13/124; G06F 3/0601; G06F 2003/0691–2003/0698
See application file for complete search history.

(56) References Cited

U.S. PATENT DOCUMENTS

| | | | | |
|---|---|---|---|---|
| 2003/0229844 A1* | 12/2003 | Bansal | .................... | H04L 69/40 714/821 |
| 2013/0080822 A1* | 3/2013 | Compton | ............ | G06F 11/0745 714/3 |
| 2013/0124929 A1* | 5/2013 | Harada | .................... | G06F 11/00 714/49 |

* cited by examiner

*Primary Examiner* — Jason Bryan
(74) *Attorney, Agent, or Firm* — Jianq Chyun IP Office

(57) ABSTRACT

An error handling method, a memory storage device and a memory controlling circuit unit are provided. The method includes obtaining a finished event corresponding to a channel; determining whether the finished event is a failed event, if the finished event is the failed event; stopping an operation of the channel and performing a first update operation on a counting value corresponding to the channel; and if the finished event is not the failed event, keeping the counting value corresponding to the channel unchanged and processing the finished event. The step of the processing the finished event includes performing a second update operation on the counting value corresponding to the channel if the finished event is the failed event, and recovering the operation of the channel if the counting value matches a threshold criterion. Accordingly, it can improve the accessing performance.

21 Claims, 7 Drawing Sheets ial no. 103100843, filed on Jan. 9, 2014. The
ERROR HANDLING METHOD, MEMORY STORAGE DEVICE AND MEMORY CONTROLLING CIRCUIT UNIT

CROSS-REFERENCE TO RELATED APPLICATION

This application claims the priority benefit of Taiwan application serial no. 103100843, filed on Jan. 9, 2014. The entirety of the above-mentioned patent application is hereby incorporated by reference herein and made a part of this specification.

BACKGROUND

1. Technology Field

The present invention is directed to an error handling method and more particularly, to an error handling method, a memory storage device and a memory controlling circuit unit for a rewritable nonvolatile memory module.

2. Description of Related Art

Digital cameras, cell phones, and MP3 players have undergone rapid growth in recent years, so that consumer demands for storage media have also rapidly increased. A rewritable non-volatile memory is one of the most adaptable memories for being built in the aforementioned portable multimedia devices due to its characteristics such as data non-volatility, low power consumption, small volume, non-mechanical structure, and high read-and-write speed.

Generally, the rewritable nonvolatile memory module is controlled by a memory controlling circuit unit. In some implementations, a plurality of channels are coupled between the memory controlling circuit unit and the rewritable nonvolatile memory module so as to improve accessing efficiency. When a failed event occurs on a channel, an operation of the channel is stopped until an error handing corresponding to the failed event is performed. However, if a command is executed in a pipeline manner, a plurality of failed events may probably occur on the channel, and thus, the operation of the channel may be recovered after all the failed events are checked, which results in reduction of the accessing performance. Therefore, how to improve the accessing performances under the aforementioned scenarios has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides an error handling method, a memory storage device and a memory controlling circuit unit which are capable of improving accessing performance.

According to an exemplary embodiment of the present invention, an error handling method for a memory controlling circuit unit is provided, wherein a plurality of channels are coupled between the memory controlling circuit unit and a rewritable nonvolatile memory module. The error handling method includes obtaining a finished event corresponding to a first channel, determining whether the finished event is a failed event, stopping an operation of the first channel and performing a first update operation on a counting value corresponding to the first channel if the finished event is the failed event, keeping the counting value corresponding to the first channel unchanged if the finished event is not the failed event, and processing the finished event. The step of processing the finished event includes perfo ing a second update operation on the counting value corresponding to the first channel if the finished event is the failed event and recovering the operation of the first channel if the counting value matches a threshold criterion.

According to an exemplary embodiment of the present invention, a memory storage device including a connection interface unit, a rewritable nonvolatile memory module and a memory controlling circuit unit is provided. The connection interface unit is configured to be coupled to a host system. The rewritable nonvolatile memory module includes a plurality of physical erasing units. The memory controlling circuit unit is coupled to the connection interface unit and the rewritable nonvolatile memory module, and channels are coupled between the memory controlling circuit unit and the rewritable nonvolatile memory module. The memory controlling circuit unit is configured to obtain a finished event corresponding to a first channel and determine whether the finished event is a failed event. If the finished event is the failed event, the memory controlling circuit unit is configured to stop an operation of the first channel and perform a first update operation on a counting value corresponding to the first channel. If the finished event is not the failed event, the memory controlling circuit unit is configured to keep the counting value corresponding to the first channel unchanged. The memory controlling circuit unit is configured to process the finished events. And, in the operation of processing the finished event, the memory controlling circuit unit is configured to perform a second update operation on the counting value corresponding to the first channel if the finished event is the failed event, and the memory controlling circuit unit is configured to recover the operation of the first channel if the counting value matches a threshold criterion.

According to an exemplary embodiment of the present invention, a memory controlling circuit unit for a rewritable nonvolatile memory module is provided. The memory controlling circuit unit includes a host interface, a memory interface and a memory management circuit. The host interface is configured to be coupled to a host system. The memory interface is configured to be coupled to the rewritable nonvolatile memory module. Channels are coupled between the memory controlling circuit unit and the rewritable nonvolatile memory module. The memory management circuit is coupled to the host interface and the memory interface. The memory interface is configured to obtain a finished event corresponding to a first channel and determine whether the finished event is a failed event. If the finished event is the failed event, the memory interface is configured to stop an operation of the first channel and perform a first update operation on a counting value corresponding to the first channel, and if the finished event is not the failed event, the memory management circuit is configured to keep the counting value corresponding to the first channel unchanged. The memory management circuit is configured to process the finished events. And, in the operation of processing the finished event, the memory management circuit is configured to perform a second update operation on the counting value corresponding to the first channel if the finished event is the failed event, and the memory management circuit is configured to recover the operation of the first channel if the counting value matches a threshold criterion.

Based on the above, the exemplary embodiments of the invention provide the error handling method, the memory storage device and the memory controlling circuit unit, by which the operation of a channel can be recovered as soon as possible to improve the accessing performance of the rewritable nonvolatile memory module.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the content of the invention clearer and more comprehensible, the following embodiments are illustrated as examples that can be truly implemented by the invention with reference to the accompanying drawings.

BRIEF DESCRIPTION OF THE DRAWINGS

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

DESCRIPTION OF EMBODIMENTS

Figure 1A:
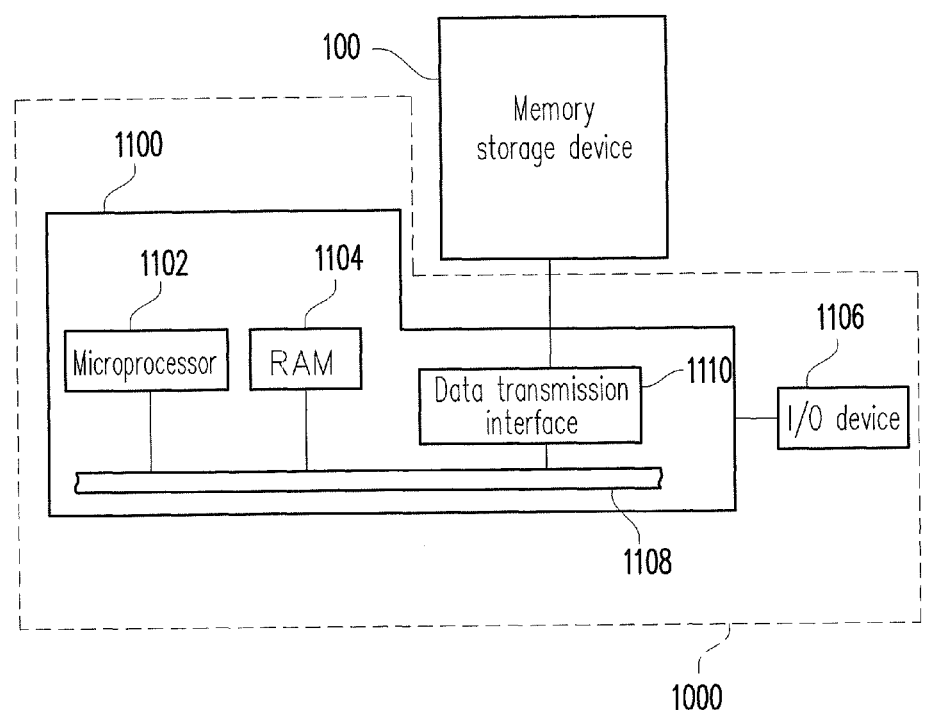
FIG. 1A is a schematic block diagram illustrating a host system and a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a rewritable nonvolatile memory module and a controller (which is also referred to as a control circuit). The memory storage device is generally used together with a host system, so that the host system can write data into the memory storage device or read data from the memory storage device.

Figure 1B:
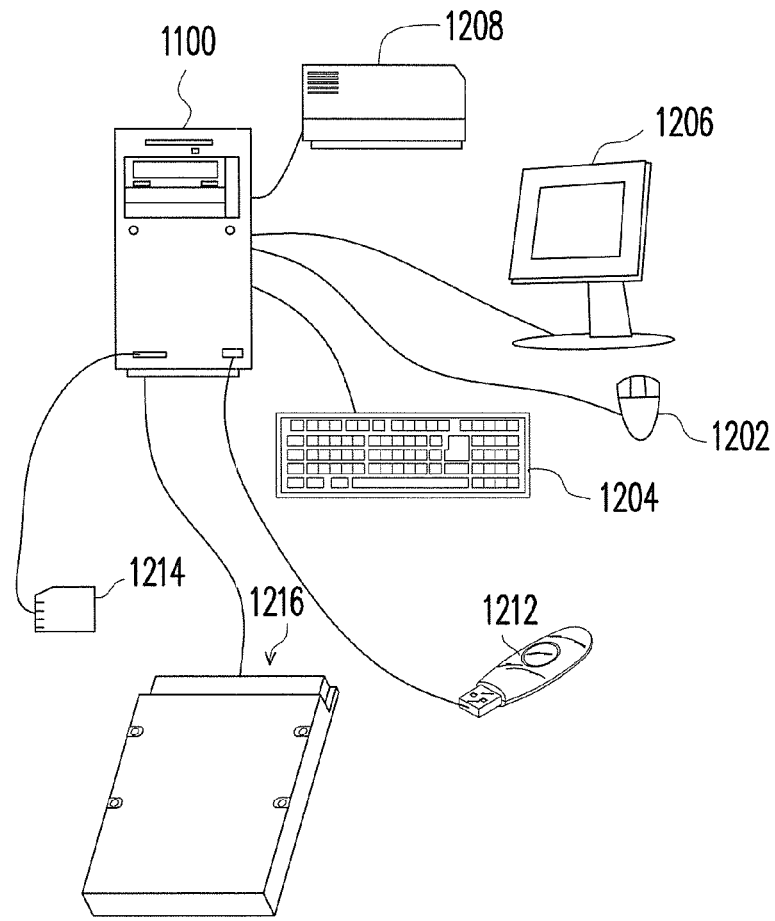
FIG. 1B is a schematic diagram illustrating a computer, an input/output (I/O) device, and a memory storage device according to an exemplary embodiment of the present invention.
Figure 1C:
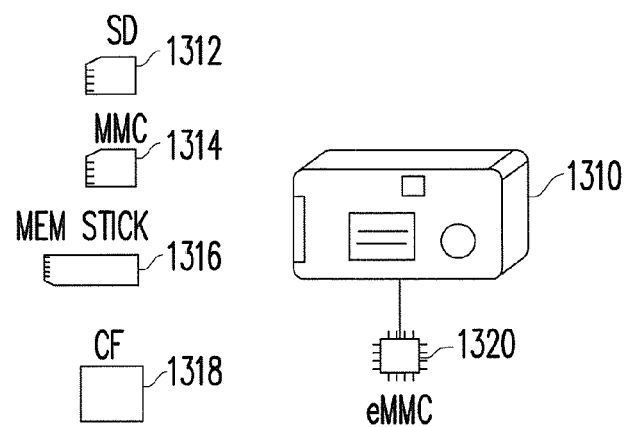
FIG. 1C is a schematic diagram illustrating a host system and a memory storage device according to another exemplary embodiment of the present invention.

FIG. 1A is a schematic block diagram illustrating a host system and a memory storage device according to an exemplary embodiment of the present invention. FIG. 1B is a schematic diagram illustrating a computer, an input/output (I/O) device, and a memory storage device according to an exemplary embodiment of the invention. FIG. 1C is a schematic diagram illustrating a host system and a memory storage device according to another exemplary embodiment of the invention.

With reference to FIG. 1A, a host system 1000 typically includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that, the devices depicted in FIG. 1B should not be construed as limitations to the present invention, and the I/O device 1106 may include other devices as well.

In an exemplary embodiment of the present invention, the memory storage device 100 is coupled to other components of the host system 1000 through the data transmission interface 1110. By the operation of the microprocessor 1102, the RAM 1104, and the I/O device 1106, the host system 1000 may write data into the memory storage device 100 or read data from the memory storage device 100. For example, the memory storage device 100 may be rewritable nonvolatile memory storage device, such as a flash drive 1212, a memory card 1214 or a solid state drive (SSD) 1216, as shown in FIG. 1B.

Generally speaking, the host system 1000 may be any system that is substantially operated together with the memory storage device 100 to store data. Even though the host system 1000 is described as a computer system in the present exemplary embodiment, in another exemplary embodiment, the host system 1000 may also be a system, such as digital camera, a video camera, a communication device, an audio player, a video player or the like. For example, when the host system is a digital camera (video camera) 1310, the rewritable nonvolatile memory storage device may be a secure digital (SD) card 1312, a multimedia card (MMC) 1314, a memory stick 1316, a compact flash (CF) card 1318, or an embedded storage device 1320, used by the digital camera 1310 (as shown in FIG. 1C). The embedded storage device 1320 includes an embedded MMC (eMMC). It should be mentioned that the eMMC is directly coupled to the substrate of the host system.

Figure 2:
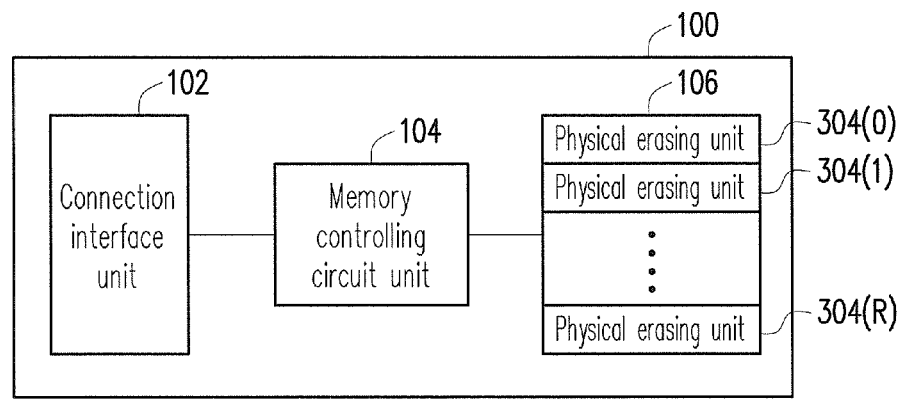
FIG. 2 is a schematic block diagram of the memory storage device depicted in FIG. 1A.

FIG. 2 is a schematic block diagram of the memory storage device depicted in FIG. 1A.

With reference to FIG. 2, the memory storage device 100 includes a connection interface unit 102, a memory controlling circuit unit 104 and a rewritable nonvolatile memory module 106.

In the present exemplary embodiment, the connection interface unit 102 complies with the serial advanced technology attachment (SATA) standard. However, it should be understood that the present invention is not limited thereto, and the connection interface unit 102 may also comply with the parallel advanced technology attachment, (PATA) standard, the institute of electrical and electronic engineers (IEEE) 1394 standard, the peripheral component interconnect express (PCI Express) standard, the universal serial bus (USB) standard, the secure digital (SD) interface standard, the ultra high speed-I (UHS-I) interface standard, the ultra high speed-II (UHS-II) interface standard, the memory stick (MS) interface standard, the multi-media card (MMC) interface standard, the embedded multimedia card (eMMC) interface standard, the universal flash storage (UFS) interface standard, the compact flash (CF) interface standard, the integrated device electronics (IDE) standard or any other suitable standard. The connection interface unit 102 and the memory controlling circuit unit 104 may be packaged together in a chip, or alternatively, the connection interface unit 102 is disposed in the outside of a chip containing the memory controlling circuit unit 104.

The memory controller 104 executes a plurality of logic gates or control instructions implemented in a hardware form or a firmware form and performs various data operations such as data writing, reading, and erasing in the rewritable nonvolatile memory module 106 according to the host commands from the host system 1000.

The rewritable nonvolatile memory module 106 is coupled to the memory controlling circuit unit 104 and store data written from the host system 1000. The rewritable nonvolatile memory module 106 has physical erasing units 304(0) to 304(R). For instance, the physical erasing units 304(0) to 304(R) may belong to the same memory die or belong to different memory dies. Each physical erasing unit has a plurality of physical programming units, and the physical programming units in the same physical erasing unit may be written separately and erased simultaneously. For example, each physical erasing unit is composed by 128 physical programming units. Nevertheless, it should be understood that the present invention is not limited thereto. Each physical erasing unit may be composed by 64 physical programming units, 256 physical programming units or any amount of the physical programming units.

To be more specific, each of the physical erasing units includes a plurality of word lines and a plurality of bit lines, and a memory cell is disposed at an intersection of each word line and each bit line. Each memory cell may store one or more bits. All the memory cells in the same physical erasing unit are erased together. In the present exemplary embodiment, a physical erasing unit is the smallest erasing unit. Namely, each of the physical blocks contains the least number of memory cells which are erased altogether. For example, the physical erasing units are physical blocks. On the other hand, the memory cells on the same word line form one or more physical programming units. If each memory cell stores two or more bits, the physical programming units on the same word line may be categorized as a lower physical programming unit and an upper physical programming unit. Generally speaking, a writing speed of the lower physical programming unit is higher than a writing speed of an upper physical programming unit. In the present exemplary embodiment, each physical programming unit is the smallest programming unit. In other words, each physical programming unit is the smallest unit for writing data. For example, the physical programming unit is a physical page or a physical sector. If the physical programming unit is one physical page, each of the physical programming units generally includes a data bit area and a redundant bit area. The data bit area includes a plurality of physical sectors for storing user data, and the redundant bit area is configured for storing system data (e.g. an error correcting code). In the present exemplary embodiment, each data bit area includes 32 physical sectors, and each physical sector is 512 bytes (B). However, in other exemplary embodiments, the data bit area may include 8, 16, or more or fewer physical sectors. The present invention is not intent to limit the size and number of the physical sectors.

In the present exemplary embodiment, the rewritable nonvolatile memory module 106 is a multi level cell (MLC) NAND flash memory module. That is, each memory cell stores at least two bits. However, the present invention is not limited thereto, and the rewritable nonvolatile memory module 106 may also be a single level cell (SLC) NAND flash memory module, a trinary level cell (TLC) NAND flash memory module, any other flash memory module, or a memory module having the same characteristics.

Figure 3:
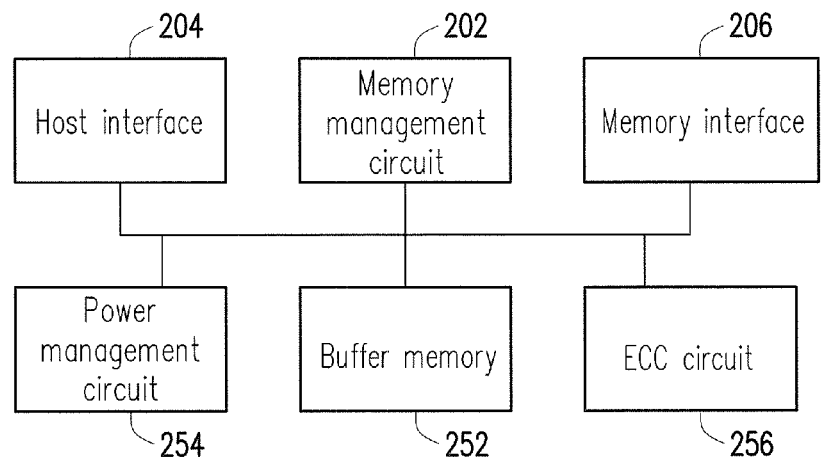
FIG. 3 is a schematic block diagram illustrating a memory controlling circuit unit according to an exemplary embodiment of the present invention.

FIG. 3 is a schematic block diagram illustrating a memory controlling circuit unit according to an exemplary embodiment of the present invention.

With reference to FIG. 3, a memory controlling circuit unit 104 includes a memory management circuit 202, a host interface 204 and a memory interface 206.

The memory management circuit 202 is configured to control the overall operation of the memory controlling circuit unit 104. More specifically, the memory management circuit 202 has a plurality of control instructions. When the memory storage device 100 is operated, the control instructions are executed to perform various data operations such as data writing, data reading, and data erasing. The following description of the operation of the memory management circuit 202 is equivalent to the description of the operation of the memory controlling circuit unit 104, which will not be repeated hereinafter.

In the present exemplary embodiment, the control instructions of the memory management circuit 202 are implemented in a firmware form. For instance, the memory management circuit 202 has a microprocessor unit (not shown) and a read-only memory (not shown), and the control instructions are burnt into the read-only memory. When the memory storage device 100 is operated, the control instructions are executed by the microprocessor unit for performing various data operations, such as data writing, data reading, and data erasing.

In another exemplary embodiment, the control instructions of the memory management circuit 202 may also be stored in a specific area (e.g., the system region in the memory module exclusively used for storing the system data) of the rewritable nonvolatile memory module 106 as program codes. Moreover, the memory management circuit 202 has a microprocessor unit (not shown), a read-only memory (not shown), and a random access memory (not shown). In particular, the read-only memory has a boot code, and when the memory controlling circuit unit 104 is enabled, the microprocessor unit first executes the boot code to load the control instructions stored in the rewritable non-volatile memory module 106 into the random access memory of the memory management circuit 202. Afterwards, the microprocessor unit executes the control instructions for various data operations such as data writing, data reading, and data erasing.

Additionally, in another exemplary embodiment, the control instructions of the memory management circuit 202 may be implemented in a hardware form. For example, the memory management circuit 202 includes a microcontroller, a memory management circuit, a memory writing circuit, a memory reading circuit, a memory erasing circuit, and a data processing circuit. The memory management unit, the memory writing unit, the memory reading unit, the memory erasing unit, and the data processing unit are coupled to the microcontroller. The memory management unit is configured for managing the physical erasing units of the rewritable non-volatile memory module 106. The memory writing unit is configured to issue a write command to the rewritable non-volatile memory module 106 for writing data to the rewritable non-volatile memory module 106. The memory reading unit is configured to issue a read command to the rewritable non-volatile memory module 106 for reading data from the rewritable non-volatile memory module 106. The memory erasing unit is configured to issue an erase command to the rewritable non-volatile memory module 106 for erasing data from the rewritable non-volatile memory module 106. The data processing unit is configured to process the data to be written to the rewritable non-volatile memory module 106 and the data to be read from the rewritable non-volatile memory module 106.

The host interface 204 is coupled to the memory management circuit 202 and configured to receive and identify commands and data transmitted from the host system 1000. In other words, the commands and data from the host system 1000 are transmitted to the memory management circuit 202 through the host interface 204. In the present exemplary embodiment, the host interface 204 is compatible to the SATA standard. However, it should be understood that the invention is not limited thereto, and the host interface 204 may also be compatible to the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or any other suitable standard for data transmission.

The memory interface 206 is coupled to the memory management circuit 202 and configured to access the rewritable nonvolatile memory module 106. Namely, the data to be written into the rewritable nonvolatile memory module 106 is transformed to a format that is acceptable to the rewritable non-volatile memory module 106 by the memory interface 206.

In an exemplary embodiment of the present invention, the memory controlling circuit unit 104 further includes a buffer memory 252, a power management circuit 254, and an error checking and correcting (ECC) circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to manage the power of the memory storage device 100.

The ECC circuit 256 is coupled to the memory management circuit 202 and configured to execute an error checking and correcting procedure to ensure the correctness of data. To be more specific, when the memory management circuit 202 receives a write command from the host system 1000, the ECC circuit 256 generates an error correcting code (ECC) corresponding to the data of the write command, and the memory management circuit 202 writes the data and the corresponding ECC into the rewritable non-volatile memory module 106. Subsequently, when the memory management circuit 202 reads the data from the rewritable non-volatile memory module 106, the corresponding ECC is also read, and the ECC circuit 256 executes the error checking and correcting procedure on the data which is read based on the ECC.

Figure 4:
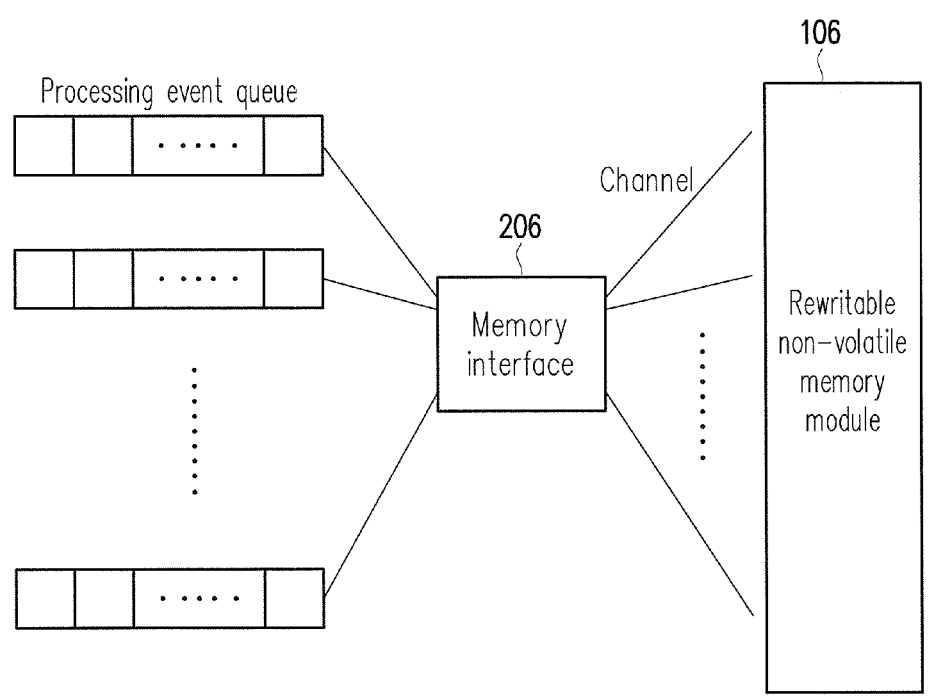
FIG. 4 is a schematic diagram illustrating an example of issuing a command to the rewritable nonvolatile memory module according to an exemplary embodiment of the present invention.

FIG. 4 is a schematic diagram illustrating an example of issuing a command to the rewritable nonvolatile memory module according to an exemplary embodiment of the present invention.

With reference to FIG. 4, a plurality of channels are disposed in the memory storage device 100, and the channels are coupled between the memory controlling circuit unit 104 and the rewritable nonvolatile memory module 106. The memory controlling circuit unit 104 accesses different physical erasing units in the rewritable nonvolatile memory module 106 through the channels, and the channel may be operated independently. For example, when performing a writing operation through one of the channels, the memory controlling circuit unit 104 may simultaneously performs a reading operation though another channel. However, the same or different operations may be performed on different channels, and the present invention is not limited thereto. In the present exemplary embodiment, each of the channels has a processing event queue, and the processing event queue may be implemented in a software or a hardware form, but the present invention is not limited thereto. For instance, if the processing event queue is implemented in the software form, the memory management circuit 202 configures a space in the buffer memory 252 for each processing event queue. Each processing event queue is configured to store a command waiting to be executed by the corresponding channel. Specifically speaking, when the memory management circuit 202 is to issue a command through one of the channels, the memory management circuit 202 adds the command into a corresponding processing event queue. Thereafter, the memory interface 206 obtains the command from the corresponding processing event queue and executes the command in a pipeline manner. For instance, when a read command is executed, the memory interface 206 first reads data from the rewritable nonvolatile memory module 106 (the first stage), and then, the read data is decoded by the ECC circuit 256 (the second stage). Accordingly, the first stage of one read command may be simultaneously executed with the second stage of another read command.

When an execution of a command corresponding to one of the channels (referred to as a first channel hereinafter) is finished, the memory interface 206 obtains a finished event corresponding to the first channel. The finished event may be configured to indicate whether the corresponding command is executed successfully. The memory interface 206 determines whether the finished event is a failed event. For example, the failed event may represent a read failure, a write failure or an erase failure, but the present invention is not intent to limit the content represented by the finished event and the failed event. If the finished event is the failed event, the memory interface 206 stops an operation of the first channel and performs a first update operation on a counting value corresponding to the first channel. If the finished event is not the failed event, the memory interface 206 keeps the counting value corresponding to the first channel unchanged. In an exemplary embodiment of the present invention, the first update operation is configured to increase the counting value, and the counting value is configured to indicate how many failed events corresponding to the first channel are not yet processed. The memory management circuit 202 processes the finished events. If the finished event processed by the memory management circuit 202 is not the failed event, it indicates that the command corresponding to the finished event is executed successfully, and thus, the memory management circuit 202 may continue to perform subsequent operations. If the finished event processed by the memory management circuit 202 is the failed event, it indicates that the command corresponding to the finished event is not executed successfully, and thus, the memory management circuit 202 performs a corresponding error handling procedure. However, each time when handling a failed event corresponding to the first channel, the memory management circuit 202 perfonns a second update operation on the counting value corresponding to the first channel. In an exemplary embodiment of the present invention, the second update operation is configured to decrease the counting value, and the memory management circuit 202 recovers the operation of the first channel when the counting value matches a threshold criterion. For example, after recovering the operation of the first channel, the memory interface 206 may again issue a command to the rewritable nonvolatile memory module 106 through first channel. In other words, according to the counting value corresponding to the first channel, the memory management circuit 202 may learn whether there is any failed event corresponding to the first channel that is not yet handled and thereby recover the operation of the first channel as soon as possible so as to improve the performance.

In the above exemplary embodiment, the first update operation is configured to increase the counting value, while the second update operation is configured to decrease the counting value. Nevertheless, in another exemplary embodiment, the first update operation is configured to decrease the counting value, and the second update operation is configured to increase the counting value, and the present invention is not limited thereto. In the exemplary embodiment below, the finished events are managed by using a data structure of queues. However, in another exemplary embodiment, the finished events may be managed by using any other data structure, which construe no limitations to the invention.

Figure 5:
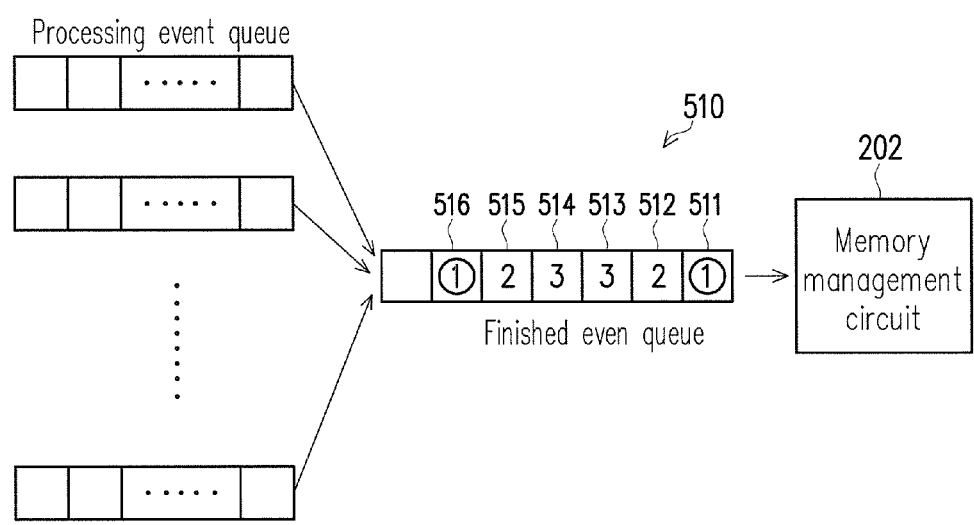
FIG. 5 is a schematic diagram illustrating a finished event queue according to an exemplary embodiment of the present invention.

FIG. 5 is a schematic diagram illustrating a finished event queue according to an exemplary embodiment of the invention.

With reference to FIG. 5, in the present exemplary embodiment, each of the channels has a counting unit, and the counting unit is configured to update a counting value corresponding to each of the channels. The counting unit may be implemented in a hardware form or a software form, which is not limited in the present invention. For example, the counting unit may be implemented as a circuit in the memory interface 206. Alternatively, the memory management circuit 202 may configure a space in the buffer memory 252 for each counting unit (which may be a code or a variable).

Additionally, the processing event queues of all the channels correspond to a finished event queue 510 which is configured to store finished events generated by the channel. The finished event queue 510 may also be implemented in a hardware form or a software form. For example, the memory management circuit 202 may configure a space in the buffer memory 252 for the finished event queue 510. Specifically speaking, when obtaining a finished event, the memory interface 206 adds the obtained finished event into the finished event queue 510. Meanwhile, if the added finished event is a failed event, the memory interface 206 stops an operation of the corresponding channel, and the corresponding counting unit increases the counting value of that channel (e.g., by adding 1, which is the first update operation). For example, numerals on the finished events 511 through 516 indicate which channel that each of the finished events corresponds to, and the finished events 511 and 516 are failed events. The memory interface 206 first adds the finished event 511 into the finished event queue 510 and then, adds the finished events 512 through 516 in sequence. Due to the finished event 511 being a failed event, when the finished event 511 is added into the finished event queue 510, the memory interface 206 stops the operation of the first channel (e.g., stops issuing commands to the rewritable nonvolatile memory module 106 through the first channel), and the counting unit of the first channel increases the counting value corresponding to the first channel. When the finished event 512 is added into the finished event queue 510, the second channel remains being operated since the finished event 512 is not a failed event, and the counting unit of the second channel keeps the counting value corresponding to the second channel unchanged. The finished events 513 to 516 may also be operated in the same way and will not be repeatedly described hereinafter. Thus, after the finished events 511 through 516 are added, the counting value corresponding to the first channel is 2, while the counting value the counting values corresponding to the second channel and the third channel are 0. In other words, each counting value indicates a total number of the failed events of each corresponding channel in the finished event queue 510.

The memory management circuit 202 obtains a finished event from the finished event queue 510 and performs a corresponding handing procedure thereon. To be more specific, the memory management circuit 202 first obtains the finished event 511 and determines whether the finished event 511 is the failed event. Due to the finished event 511 being the failed event, the memory management circuit 202 decreases the counting value corresponding to the first channel (e.g., by deducting 1, which is the second update operation) and performs an error handling procedure. In an exemplary embodiment, the memory management circuit 202 decreases the counting value corresponding to the first channel only after the first channel is in a stable state. The stable state represents that the first channel does not execute any command currently, and in this scenario, the memory interface 206 is incapable of changing the counting value corresponding to the first channel. After the counting value corresponding to the first channel is decreased, the memory management circuit 202 further determines whether the counting value corresponding to the first channel complies with threshold criteria. For example, the memory management circuit 202 determines whether the counting value is equal to a threshold (e.g., 0), and if yes, it is determined that the first channel matches the threshold criterion. In the exemplary embodiment illustrated in FIG. 5, after the finished event 511 is processed, the counting value corresponding to the first channel is 1 (which does not comply with the threshold criteria), and it indicates that there is one failed event corresponding to the first channel which is not yet handled still in the finished event queue 510, and therefore the memory management circuit 202 maintains stopping the operation of the first channel.

Afterwards, the memory management circuit 202 obtains the finished events 512 through 515. Due to the finished events 512 through 515 being not the failed events, the memory management circuit 202 keeps the counting values corresponding to the second channel and the third channel unchanged. Thereafter, the memory management circuit 202 obtains the finished event 516 and deducts 1 from the counting value corresponding to the first channel. After the finished event 516 is processed, the counting value corresponding to the first channel is 0 (which matches the threshold criterion), it indicates that there is no failed event corresponding to the first channel in the finished event queue 510, and thus, the memory management circuit 202 recovers the operation of the first channel.

Figure 6A:
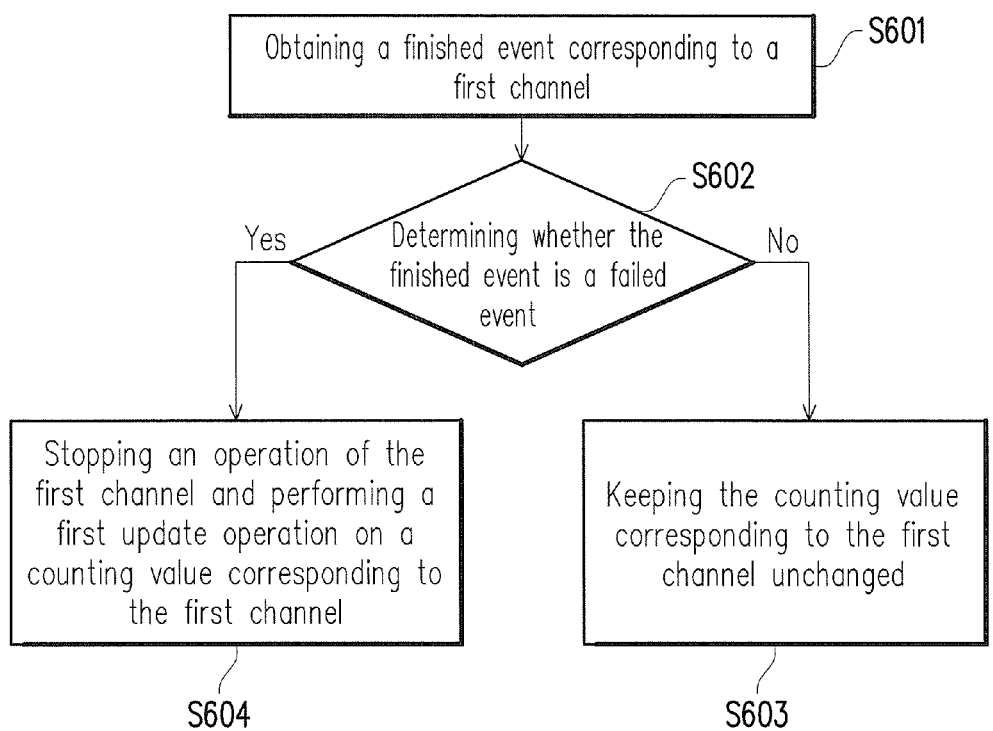
FIG. 6A and FIG. 6B are flowcharts illustrating an error handling method according to an exemplary embodiment of the present invention.
Figure 6B:
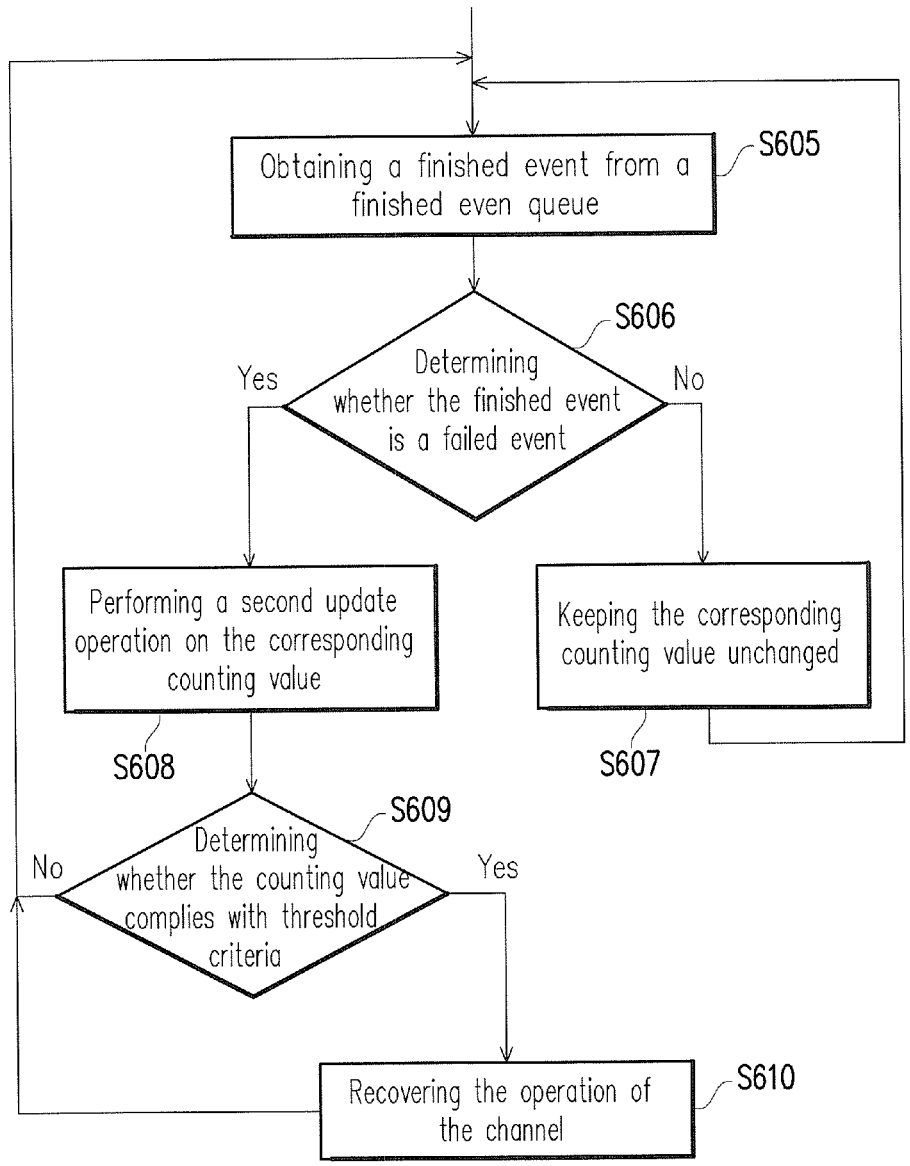

FIG. 6A and FIG. 6B are flowcharts illustrating an error handling method according to an exemplary embodiment of the present invention.

With reference to FIG. 6A, in step S601, a finished event corresponding to a first channel is obtained. In step S602, whether the finished event is a failed event is determined. If the finished event is not the failed event, in step S603, the counting value corresponding to the first channel keeps unchanged. If the finished event is the failed event, in step S604, an operation of the first channel is stopped, and a first update operation is performed on a counting value corresponding to the first channel.

With reference to FIG. 6B, in step S605, a finished event is obtained from a finished event queue. In step S606, whether the obtained finished event is a failed event is determined. If the obtained finished event is not the failed event, in step S607, the corresponding counting value keeps unchanged. If the obtained finished event is the failed event, in step S608, a second update operation is performed on the corresponding counting value. In step S609, whether the counting value matches a threshold criterion is determined. If the counting value matches the threshold criterion, in step S610, the operation of the channel is recovered.

Detailed description with respect to each step of the error handling method has been set forth with reference to FIG. 6A and FIG. 6B above and will not be repeated hereinafter. It should be noticed that each step illustrated in FIG. 6A and FIG. 6B may also be implemented as a plurality of codes or a plurality of circuits, which is not limited in the present invention. Moreover, the methods illustrated in FIG. 6A and FIG. 6B may be performed simultaneously together with the above exemplary embodiment or may be performed solely, which construe no limitations to the present invention.

To sum up, in the error handling method, the memory storage device and the memory controlling circuit unit provided according to the exemplary embodiments of the invention, how many failed events not yet handled may be calculated by means of the counting values, and thereby, the operations of the channels can be recovered as soon as possible to improve the access performance of the rewritable nonvolatile memory module. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An error handling method for a memory controlling circuit unit, wherein a plurality of channels are coupled between the memory controlling circuit unit and a rewritable nonvolatile memory module, the error handling method comprising:
   obtaining a finished event corresponding to a first channel among the channels;
   determining whether the finished event is a failed event;
   if the finished event is the failed event, stopping an operation of the first channel and performing a first update operation on a counting value corresponding to the first channel;
   if the finished event is not the failed event, keeping the counting value corresponding to the first channel unchanged; and
   processing the finished event, wherein the step of processing the finished event comprises:
   if the finished event is the failed event, performing a second update operation on the counting value corresponding to the first channel and performing an error handling procedure; and
   if the counting value matches a threshold criterion, recovering the operation of the first channel.

2. The method according to claim 1, wherein the step of obtaining the finished event further comprises:
   adding the finished event into a finished event queue, wherein the first update operation increases the counting value corresponding to the first channel, the second update operation decreases the counting value corresponding to the first channel, and the counting value indicates a total number of the failed events corresponding to the first channel in the finished event queue.

3. The method according to claim 2, further comprising:
   if the counting value corresponding to the first channel is equal to a threshold, determining that the counting value matches the threshold criterion.

4. The method according to claim 2, wherein the step of processing the finished event further comprises:
   obtaining the finished event from the finished event queue; and
   if the finished event is not the failed event, keeping the counting value corresponding to the first channel unchanged.

5. The method according to claim 1, wherein the second update operation is performed after the first channel is in a stable state.

6. The method according to claim 1, further comprising:
   configuring an processing event queue for each of the channels, wherein each of the processing event queues stores a command waiting to be executed by the corresponding channel, and the command is executed in a pipeline manner;
   configuring a counting unit for each of the channels, wherein the counting unit corresponding to the first channel updates the counting value corresponding to the first channel; and
   configuring a finished event queue for the channels, wherein the finished event queue stores the finished events corresponding to the channels.

7. The method according to claim 1, wherein the step of stopping the operation of the first channel comprises:
   stopping issuing a command to the rewritable nonvolatile memory module through the first channel.

8. A memory storage device, comprising:
   a connection interface unit configured to be coupled to a host system;
   a rewritable nonvolatile memory module comprising a plurality of physical erasing units; and
   a memory controlling circuit unit coupled to the connection interface unit and the rewritable nonvolatile memory module, wherein a plurality of channels are coupled between the memory controlling circuit unit and the rewritable nonvolatile memory module,
   wherein the memory controlling circuit unit is configured to obtain a finished event corresponding to a first channel among the channels and determine whether the finished event is a failed event,
   wherein if the finished event is the failed event, the memory controlling circuit unit is configured to stop an operation of the first channel and perform a first update operation on a counting value corresponding to the first channel, wherein if the finished event is not the failed event, the memory controlling circuit unit is configured to keep the counting value corresponding to the first channel unchanged, wherein the memory controlling circuit unit is configured to process the finished event, and wherein in the operation of processing the finished event, if the finished event is the failed event, the memory controlling circuit unit is configured to perform a second update operation on the counting value corresponding to the first channel and an error handling procedure, and if the counting value matches a threshold criterion, the memory controlling circuit unit is configured to recover the operation of the first channel.

9. The memory storage device according to claim 8, wherein in the operation of obtaining the finished event, the memory controlling circuit unit adds the finished event into a finished event queue, wherein the first update operation increases the counting value corresponding to the first channel, the second update operation decreases the counting value corresponding to the first channel, and the counting value indicates a total number of the failed events corresponding to the first channel in the finished event queue.

10. The memory storage device according to claim 9, wherein if the counting value corresponding to the first channel is equal to a threshold, the memory controlling circuit unit is configured to determine that the counting value complies with the threshold criteria.

11. The memory storage device according to claim 9, wherein in the operation of processing the finished event, the memory controlling circuit unit obtains the finished event from the finished event queue, and if the finished event is not the failed event, the memory controlling circuit unit keeping the counting value corresponding to the first channel unchanged.

12. The memory storage device according to claim 8, wherein the second update operation is performed after the first channel is in a stable state.

13. The memory storage device according to claim 8, wherein each of the channels has a corresponding processing event queue and a counting unit, each of the processing event queue stores a command waiting to be executed by the corresponding channel, and the command is executed in a pipeline manner, the counting unit corresponding to the first channel updates the counting value corresponding to the first channel, and the memory controlling circuit unit is further configured to configure a finished event queue for the channels to store finished events corresponding to the channels.

14. The memory storage device according to claim 8, wherein in the operation of stopping the operation of the first channel, the memory controlling circuit unit stops issuing a command to the rewritable nonvolatile memory module through the first channel.

15. A memory controlling circuit unit for a rewritable nonvolatile memory module, the memory controlling circuit unit comprising:

a host interface configured to be coupled to a host system;

a memory interface configured to be coupled to the rewritable nonvolatile memory module, wherein a plurality of channels are coupled between the memory controlling circuit unit and the rewritable nonvolatile memory module; and a memory management circuit coupled to the host interface and the memory interface, wherein the memory interface is configured to obtain a finished event corresponding to a first channel among the channels and determine whether the finished event is a failed event, wherein if the finished event is the failed event, the memory interface is configured to stop an operation of the first channel and perform a first update operation on a counting value corresponding to the first channel, wherein if the finished event is not the failed event, the memory management circuit is configured to keep the counting value corresponding to the first channel unchanged, wherein the memory management circuit is configured to process the finished event, wherein in the operation of processing the finished event, if the finished event is the failed event, the memory management circuit is configured to perform a second update operation on the counting value corresponding to the first channel and perform an error handling procedure, and if the counting value matches a threshold criterion, the memory management circuit is configured to recover the operation of the first channel.

16. The memory controlling circuit unit according to claim 15, wherein in the operation of obtaining the finished event, the memory interface adds the finished event into a finished event queue, wherein the first update operation increases the counting value corresponding to the first channel, the second update operation decreases the counting value corresponding to the first channel, and the counting value indicates a total number of the failed events corresponding to the first channel in the finished event queue.

17. The memory controlling circuit unit according to claim 16, wherein if the counting value corresponding to the first channel is equal to a threshold, the memory management circuit is configured to determine that the counting value matches the threshold criterion.

18. The memory controlling circuit unit according to claim 16, wherein in the operation of processing the finished event, the memory management circuit obtains the finished event from the finished event queue, and if the finished event is not the failed event, the memory management circuit keeps the counting value corresponding to the first channel unchanged.

19. The memory controlling circuit unit according to claim 15, wherein the second update operation is perfoinied after the first channel is in a stable state.

20. The memory controlling circuit unit according to claim 15, wherein each of the channels has a corresponding processing event queue and a counting unit, each of the processing event queue stores a command waiting to be executed by the corresponding channel, and the command is executed in a pipeline manner, wherein the counting unit corresponding to the first channel updates the counting value corresponding to the first channel, and wherein the memory management circuit is further configured to configure a finished event queue for the channels to store finished events corresponding to the channels.

21. The memory controlling circuit unit according to claim 15, wherein in the operation of stopping the operation of the first channel, the memory interface stops issuing a command to the rewritable nonvolatile memory module through the first channel.

\* \* \* \* \*